(12) United States Patent
Daigle et al.

(10) Patent No.: US 10,513,891 B2
(45) Date of Patent: Dec. 24, 2019

(54) RUNNING TOOL LOCK MECHANISM

(71) Applicant: Halliburton Energy Services, Inc., Houston, TX (US)

(72) Inventors: Odee Paul Daigle, Sachse, TX (US); Gary Allen Kohn, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 88 days.

(21) Appl. No.: 15/554,402

(22) PCT Filed: Apr. 13, 2016

(86) PCT No.: PCT/US2016/027321
§ 371 (c)(1),
(2) Date: Aug. 29, 2017

(87) PCT Pub. No.: WO2016/204852
PCT Pub. Date: Dec. 22, 2016

(65) Prior Publication Data
US 2018/0171724 A1     Jun. 21, 2018

Related U.S. Application Data

(60) Provisional application No. 62/182,310, filed on Jun. 19, 2015.

(51) Int. Cl.
*E21B 17/043*     (2006.01)
*E21B 17/02*     (2006.01)
(Continued)

(52) U.S. Cl.
CPC ............ *E21B 17/043* (2013.01); *E21B 17/02* (2013.01); *E21B 17/04* (2013.01); *E21B 17/042* (2013.01);
(Continued)

(58) Field of Classification Search
CPC .............................. E21B 17/043; F16L 15/08
See application file for complete search history.

(56) References Cited

U.S. PATENT DOCUMENTS 1,781,091 A     11/1930   Wilson
3,463,228 A     8/1969    Hearn
(Continued)

FOREIGN PATENT DOCUMENTS

WO     2010112811 A2     10/2010

OTHER PUBLICATIONS

International Search Report and Written Opinion dated Jul. 26, 2016; International PCT Application No. PCT/US2016/027321.
(Continued)

*Primary Examiner* — Giovanna C Wright
(74) *Attorney, Agent, or Firm* — McGuireWoods LLP

(57) ABSTRACT

A downhole coupling system for joining together two segments of a tool string includes two mandrels, each having an interlocking interface at an end that abuts the adjacent mandrel and to communicate torque from one mandrel to the next. Each of the mandrels includes a threaded exterior surface, with the threaded surfaces have opposing thread directions or differing thread pitches. The coupling includes mating internal threads. A plurality of axial grooves is formed in each of the interior surface of the coupling and the exterior surface of one of the mandrels. A keyed latch ring having a plurality of internal keys and a plurality of external keys is included to engage the axial grooves, thereby rotationally locking the coupling relative to the first mandrel and second mandrel.

18 Claims, 15 Drawing Sheets

(51) Int. Cl.
*E21B 17/04* (2006.01)
*E21B 17/042* (2006.01)
*E21B 17/046* (2006.01)
*F16L 15/08* (2006.01)
*F16L 21/08* (2006.01)

(52) U.S. Cl.
CPC ............ *E21B 17/046* (2013.01); *F16L 15/08* (2013.01); *F16L 21/08* (2013.01)

(56) References Cited

U.S. PATENT DOCUMENTS

| | | | | |
|---|---|---|---|---|
| 3,942,838 | A | * | 3/1976 | Bailey .................... B25D 17/02 299/113 |
| 4,444,421 | A | * | 4/1984 | Ahlstone ................. E02D 5/523 285/334 |
| 4,762,344 | A | * | 8/1988 | Perkins ................... E21B 17/08 285/148.19 |
| 5,794,985 | A | * | 8/1998 | Mallis .................... E21B 17/042 285/330 |
| 6,070,912 | A | | 6/2000 | Latham |
| 2002/0113438 | A1 | | 8/2002 | Lynn et al. |
| 2009/0260801 | A1 | | 10/2009 | Nutley et al. |
| 2011/0121566 | A1 | | 5/2011 | Cowell et al. |
| 2011/0180273 | A1 | | 7/2011 | Hughes et al. |
| 2012/0031608 | A1 | | 2/2012 | Lembcke et al. |
| 2013/0146305 | A1 | * | 6/2013 | Dupal .................... E21B 19/16 166/380 |
| 2014/0374122 | A1 | | 12/2014 | Fanguy et al. |

OTHER PUBLICATIONS

European Communication dated Dec. 3, 2018, European Patent Application No. 16812083.0.

* cited by examiner

RUNNING TOOL LOCK MECHANISM

BACKGROUND

The present disclosure relates to oil and gas exploration and production, and more particularly to a coupling subassembly for joining together tubing segments in a tool string.

Wells are drilled at various depths to access and produce oil, gas, minerals, and other naturally-occurring deposits from subterranean geological formations. Wells are also drilled in a variety of environments, including in deep water where ocean floor conditions may be softer or more unconsolidated for desired when drilling. In such wells, drill strings and completion strings may extend to a variety of depths and may follow relatively circuitous paths to reach a location of a geological formation that is rich in extractable hydrocarbons.

To deploy tools at various locations and depths in the wellbore, a tool string, which may include a running tool, may be used to deploy tools or other devices. To form the tool string, tubing segments may be coupled together or with tooling subassemblies. These couplings may be achieved using coupling subassemblies that form robust, sealed joints between segments of tubing in a tool string.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to". Unless otherwise indicated, as used throughout this document, "or" does not require mutual exclusivity.

Liner hanger systems and other types of tool strings may be used during well construction or well remediation and repair in locations ranging from just below the wellhead system to locations deep within a well. Tool strings used in such systems may therefore be extendable, and may include couplings that are tolerant of bending and vibration induced forces to resist decoupling within the wellbore. In particular, tool strings that deploy running tools used to place or set downhole equipment, such as liner hangers, plugs or packers, may be resistant to such induced forces to maintain the integrity of the tool string and prevent the loss of the tool in the well. Tool strings that deploy other types of tools may be similarly resistant to such induced forces.

Some tool strings may include coupling assemblies where tubing segments are joined together by couplers to extend the tool string further into a formation. The present disclosure relates to a coupler assembly that tolerates the static and dynamic loads experienced by the tool string and prevents the tool string from decoupling due to vibration, torsion, and other forces that may be experienced when the tool string is rotated and/or manipulated in a well. The coupler assembly is also operable to withstand additional loads, which may result from non-conventional loading of threaded interfaces when the assembly is navigating a tight radius in the well.

Figure 1A:
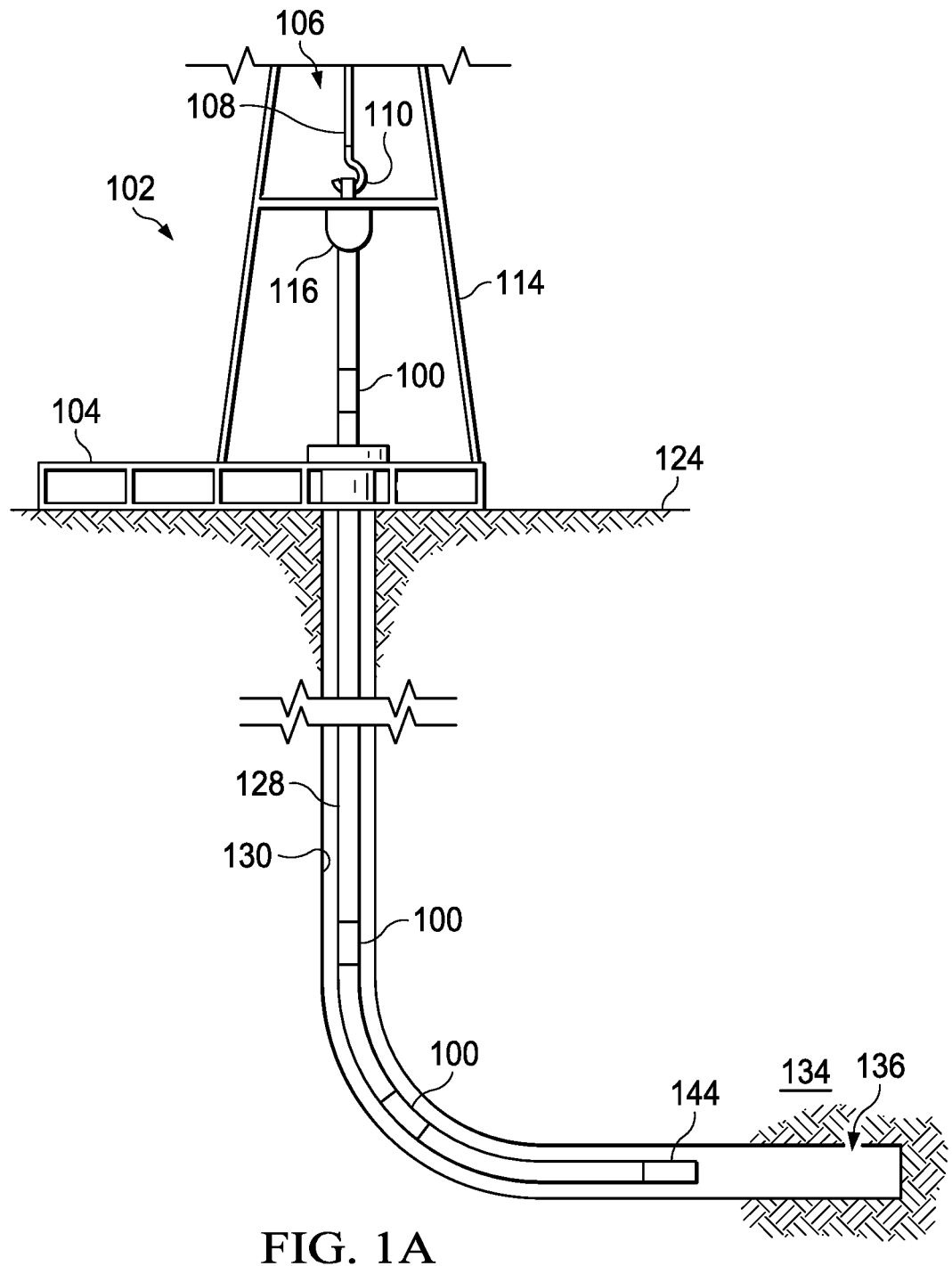
FIG. 1A illustrates a schematic view of an on-shore well in which a tool string is deployed according to an illustrative embodiment.
Figure 1B:
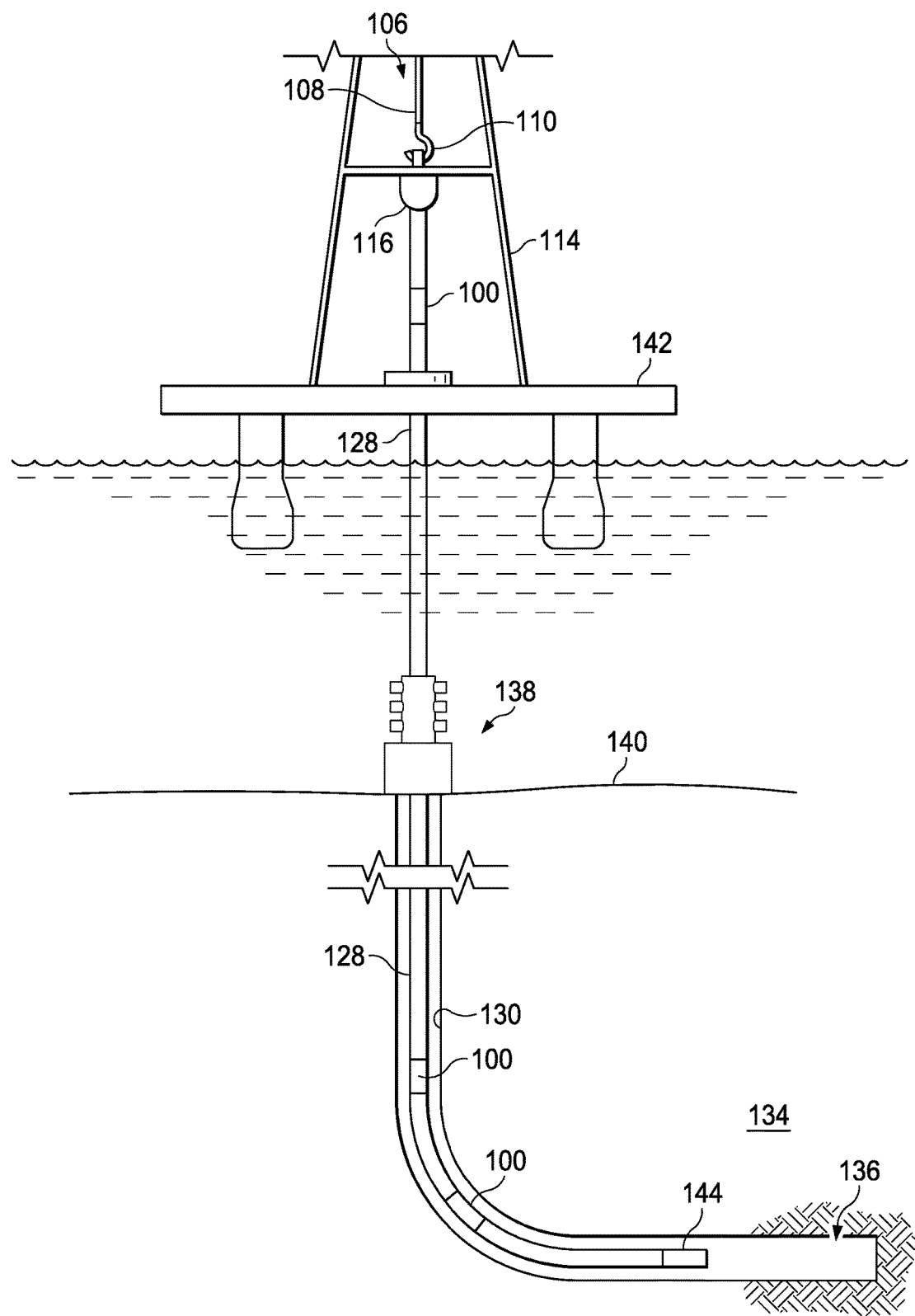
FIG. 1B illustrates a schematic view of an off-shore well in which a tool string is deployed according to an illustrative embodiment.

Turning now to the figures, FIG. 1A illustrates a schematic view of a rig 104 in which a tool string 128 is deployed that includes a coupler assembly 100 in accordance with an illustrative embodiment. The rig 104 is positioned at a surface 124 of a well 102. The well 102 includes a wellbore 130 that extends from the surface 124 of the well 102 to a subterranean substrate or formation 134. The well 102 and the rig 104 are illustrated onshore in FIG. 1A. Alternatively, FIG. 1B illustrates a schematic view of an off-shore platform 142 operating a tool string 128 that includes the coupler assembly 100 according to an illustrative embodiment. The coupler assembly 100 in FIG. 1B may be deployed in a sub-sea well 138 accessed by the offshore platform 142. The offshore platform 142 may be a floating platform or may instead be anchored to a seabed 140.

FIGS. 1A-1B each illustrate possible uses or deployments of the coupler assembly 100, which in either instance may be used in tool string 128 to deploy a tool 144 or other device downhole. In the embodiments illustrated in FIGS. 1A and 1B, the wellbore 130 has been formed by a drilling process in which dirt, rock and other subterranean material has been cut from the formation 134 by a drill bit operated via a drill string to create the wellbore 130. During or after the drilling process, a portion of the wellbore may be cased with a casing (not illustrated in FIGS. 1A and 1B). In other embodiments, the wellbore may be maintained in an open-hole configuration without casing.

The tool string 128 may include sections of tubing, each of which are joined to adjacent tubing by threaded or other connection types, such as coupler assembly 100. The tool string 128 may refer to the collection of pipes, mandrels or tubes as a single component, or alternatively to the individual pipes, mandrels, or tubes that comprise the string. The term tool string is not meant to be limiting in nature and may include a running tool or any other type of tool string used to deploy the tool 144 or equipment in the wellbore. In some embodiments, the tool string 128 may include a passage disposed longitudinally in the tool string 128 that is capable of allowing fluid communication between the surface 124 of the well 102 and a downhole location 136. It is noted that the coupler assembly 100 described herein may be used to couple tubing segments in any suitable tool string, including, for example, a running tool for deploying a liner hanger.

The lowering of the tool string 128 may be accomplished by a lift assembly 106 associated with a derrick 114 positioned on or adjacent to the rig 104 or offshore platform 142. The lift assembly 106 may include a hook 110, a cable 108, a traveling block (not shown), and a hoist (not shown) that cooperatively work together to lift or lower a swivel 116 that is coupled an upper end of the tool string 128. The tool string 128 may be raised or lowered as needed to add additional sections of tubing to the tool string 128 to position the distal end of the tool string 128 at the downhole location 136 in the wellbore 130.

Figure 2:
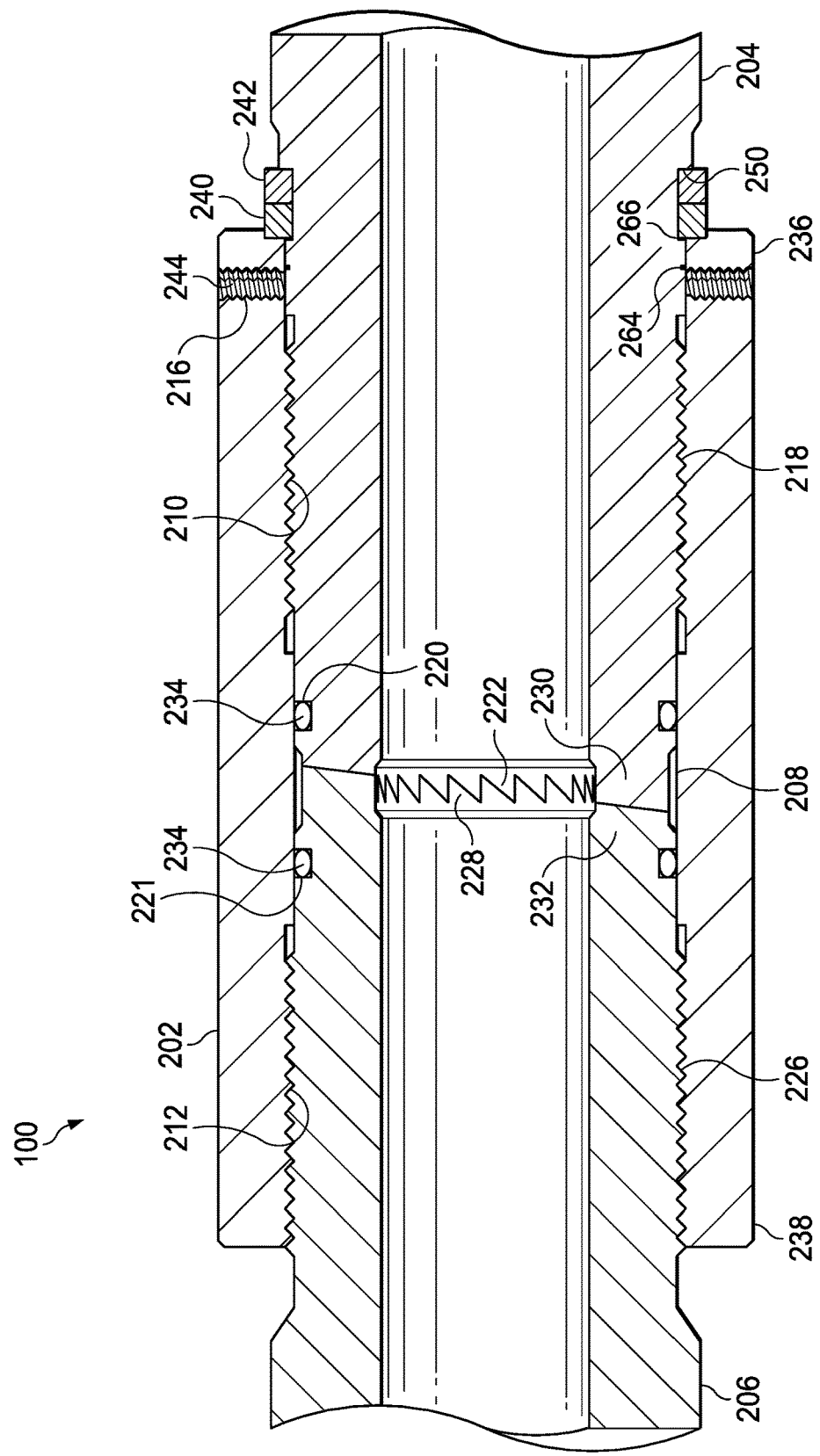
FIG. 2 illustrates a schematic, cross-section view of a coupler assembly for joining two segments of tubing together, in accordance with an illustrative embodiment.

An illustrative embodiment of a coupler assembly 100 that may be used to couple together tubing segments in a tool string is described in more detail with regard to FIGS. 2-15. Each coupler assembly 100 includes a first mandrel 204 and a second mandrel 206 joined by a coupling 202 at a first end 230 of the first mandrel 204 and a second end 232 of the second mandrel 206. Each mandrel may form a portion of a segment of a tool string. To torsionally couple the first mandrel 204 and second mandrel 206, the first end 230 of the first mandrel 204 includes a first interlocking interface 222 and the second end 232 of the second mandrel 206 includes a second interlocking interface 228. The interlocking interfaces may resemble gear teeth that complement and engage each other or a similar feature, such as a "saw tooth dog clutch interface" as is shown in FIG. 2.

When assembled, a seal bore 208, or sealing surface of the coupling 202 forms a seal against o-rings 234 installed within a first o-ring groove 220 formed in the external surface of the first end 230 of the first mandrel 204 and within a second o-ring groove 221 formed in the external surface of the second end 232 of the second mandrel 206.

The coupling 202 includes internal threads on either side of the seal bore 208 to engage the first mandrel 204 and second mandrel 206. In an embodiment, the coupling 202 includes a first internal thread 210 on a first side 236 of the coupling 202 and a second internal thread 212 on a second side 238 of the coupling 202. The first internal thread 210 engages a first external thread 218 of the first mandrel 204 and the second internal thread 212 engages a second external thread 226 of the second mandrel 206. The first internal thread 210 and second internal thread 212 and first external thread 218 and second external thread 226, respectively, may be of opposing thread directions. In such an embodiment, the coupling 202 may draw the first mandrel 204 toward the second mandrel 206 toward or away from each other when the coupling 202 is rotated in a turnbuckle type fashion, as described in more detail below. For example, in an embodiment, the first internal thread 210 and first external thread 218 may be left-hand threaded and the second internal thread 212 and second external thread 226 may be right-hand threaded. In another embodiment, the first internal thread 210 and first external thread 218 may be right-hand threaded and the second internal thread 212 and second external thread 226 may be left-hand threaded.

In another embodiment, the threads may not use opposing thread directions to cause the coupling 202 to draw the first mandrel 204 toward the second mandrel 206 and may instead rely on a differing thread pitch to induce movement of the second mandrel 206 toward the first mandrel 204. For example, the first internal thread 210 and first external thread 218 may have a thread pitch of eight threads per inch while the second internal thread 212 and second external thread 226 have a thread pitch of four threads per inch. In such an embodiment, turning of the coupling 202 would result in the interface of the first internal thread 210 and the first external thread 218 advancing at twice the rate of retreat of the interface of the second internal thread 212 and second external thread 226, resulting in the second mandrel 206 moving toward the first mandrel 204, and in turn resulting in engagement of the interlocking interface of the saw tooth dog clutch between the mandrels.

The coupling 202 and first mandrel 204 may be fixed relative to each other by a latch ring 240, which may slide under a shoulder 214 of the coupling 202 and may include internal and external keys to align with and engage axial grooves in each of the first mandrel and coupling 202. A retaining ring 242 is disposed within a groove 250 of the first mandrel 204 to resist axial motion of the coupling 202 and to prevent backing off of the latch ring 240. The assembly 100 may further include set screws 244 installed within threaded holes 216 spaced circumferentially about the coupling 202 to engage the first mandrel 204 and further restrict relative motion between the first mandrel 204 and the coupling 202.

Figure 3:
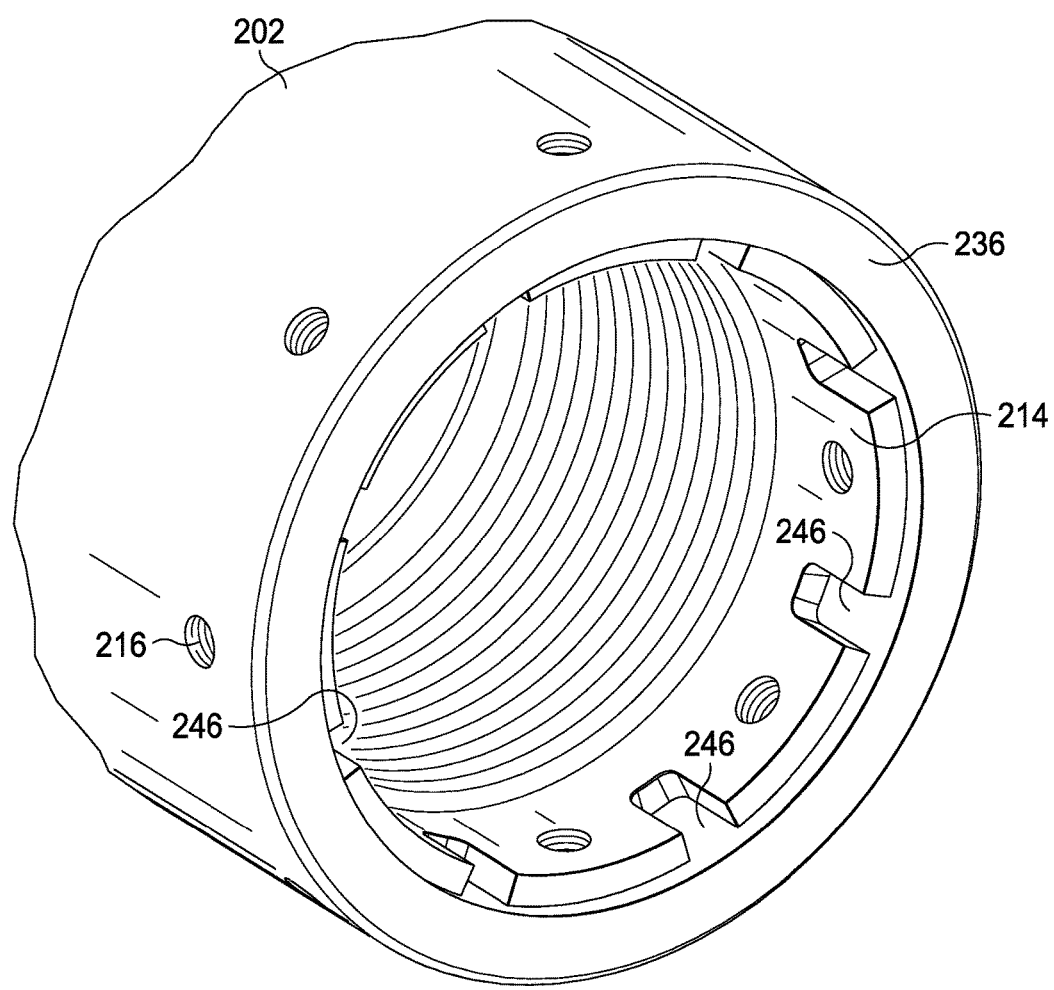
FIG. 3 illustrates a perspective view of a portion of an embodiment of a coupler used in the coupler assembly of FIG. 2.

FIG. 3 shows a portion of an exemplary coupling 202 used in the coupler assembly 100. The coupling 202 includes, as noted, a plurality of threaded holes 216 about a circumference of the coupler for receiving a set screw. In an embodiment, the coupling 202 includes eight such threaded holes 216 spaced equidistant about a circumference of the coupling 202. The coupling 202 also includes a plurality of internal axial slots 246 formed within an inner surface of the first end 236 of the coupling 202. A shoulder 214 is also formed within the inner surface of the first end 236 of the coupling 202, and may operate as a retaining feature that overlies and restricts radial deformation of the latch ring.

Figure 4:
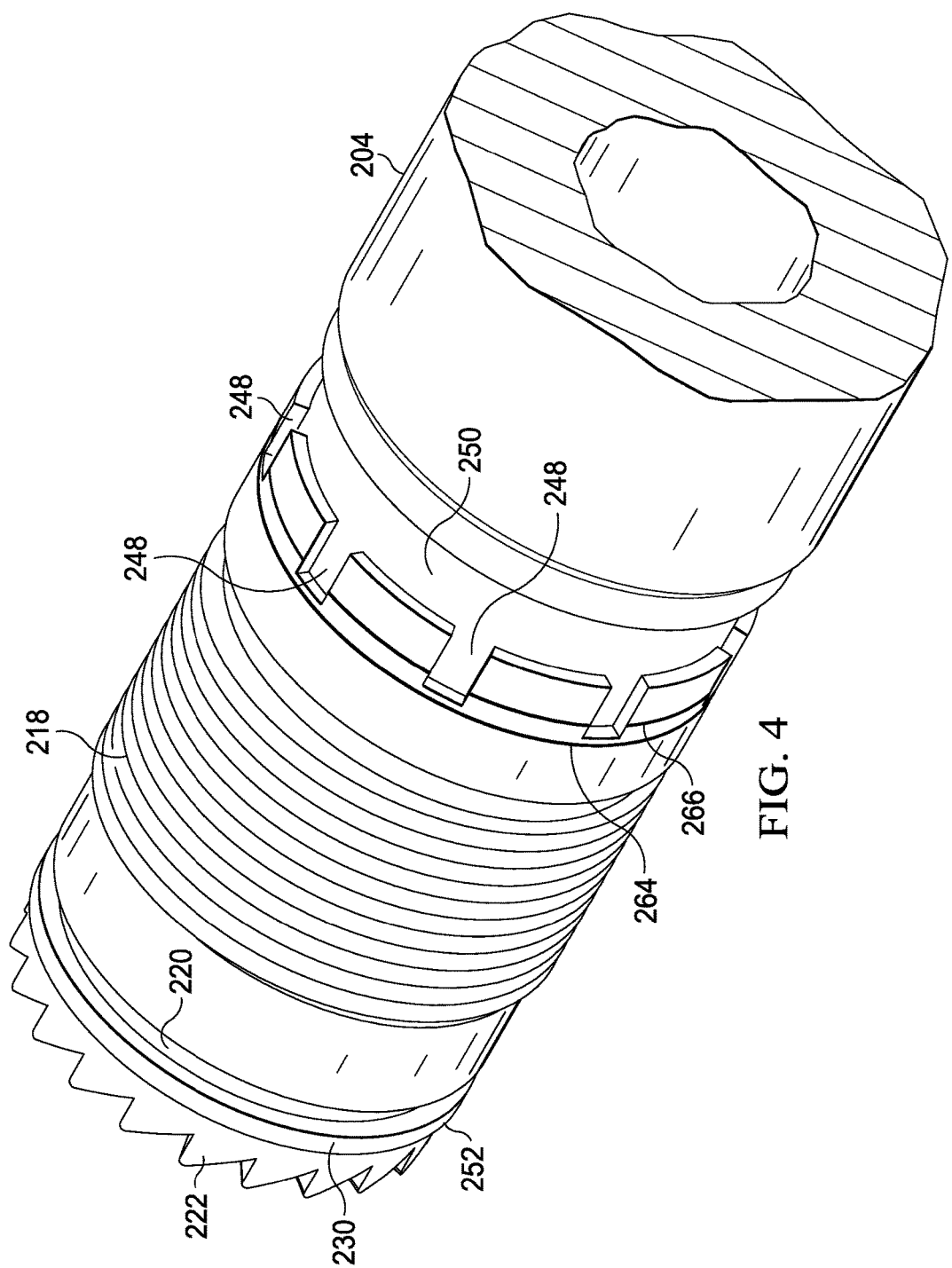
FIG. 4 illustrates a perspective view of a portion of an embodiment of a first mandrel used in the coupler assembly of FIG. 2.

FIG. 4 shows an embodiment of a first mandrel 204, as shown in the coupler assembly 100 of FIG. 2, and more particularly, a first end 230 of the first mandrel 204. The mandrel includes external threads 218 for engaging the internal threads of the coupling 202, and a first interlocking interface 222 for forming a torsional coupling with a second mandrel. A sealing surface 252 is disposed between the external threads 218 and the first interlocking interface 222, and includes a groove 220 for receiving an O-ring. On the opposite side of the external threads 218 from the sealing surface 252, a radial groove 250 is formed for receiving one or more of a latch ring and a retaining ring. A plurality of external axial slots 248 extend toward the first end 230 from the radial groove 250.

In an embodiment, the radial groove 250 may comprise a graduated groove having two outer diameters that are less than the outer diameter of the first mandrel 204 for retaining one or more of a latch ring and a retaining ring or "c-ring" in an unengaged position in a first, larger outer-diameter portion of the groove 250 and in an engaged position in a second, smaller outer-diameter portion of the groove 250. The first mandrel 204 may include a first visual indicator, which may be a milled, etched, painted, or otherwise marked radial line, on the outer surface of the first mandrel 204 at a first, predetermined distance from the first interlocking interface 222 and a similar second visual indicator at a second, predetermined distance from the first interlocking interface 222.

The number of external slots 248 of the first mandrel 204 may vary from the number of internal slots 246 of the coupling 202 to provide an interface for a Vernier-like coupling that provides a plurality of engagement positions for a keyed latch ring, as described in more detail below. For example, in an embodiment, the number of internal slots 246 may be eight and the number of external slots 248 may be nine. In another embodiment, the number of internal slots 246 may be n and the number of external slots 248 may be n+1. In another embodiment, the number of internal slots 246 may be n and the number of external slots 248 may be n−1. Similarly, in an embodiment, the number of internal slots 246 may be n and the number of external slots 248 may be y, where y≠n. In an embodiment, the external slots 248 are spaces equidistant about the circumference of the first mandrel 204 and the internal slots 246 are spaced equidistant about the interior surface of the coupling 202.

Figure 5:
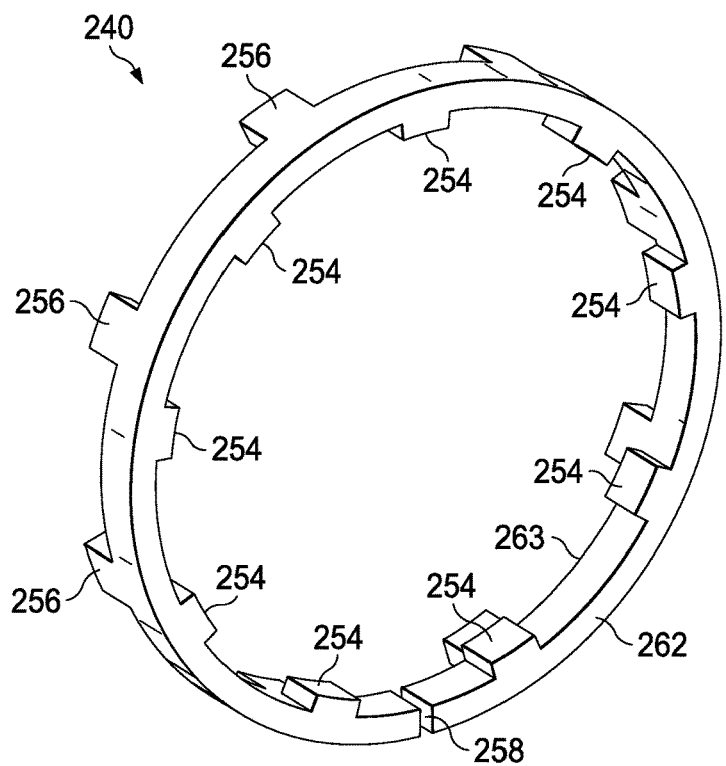
FIG. 5 illustrates a perspective view of a portion of an embodiment of a keyed latch ring used in the coupler assembly of FIG. 2.

An embodiment of a latch ring 240 having internal keys 254 for engaging the external axial slots 248 of the first mandrel 204 and external keys 256 for engaging internal axial slots 246 of the coupling 202 is shown in FIG. 5. The latch ring 240 may be referred to as a keyed latch ring and may have a first, flat side surface 262 that provides a mating surface for a retaining ring or c-ring, as described with regard to FIG. 6 to fix the latch ring 240 in an engaged or locked position. In an embodiment in which the external keys 256 extend from an otherwise flat second side surface 263, the latch ring 240 may also be referred to as a castellated latch ring. A cutaway portion 258 may be removed from the latch ring 240 to allow the latch ring 240 to be expanded and slid over the first end 230 of the first mandrel 204 toward the radial groove 250 in preparation for installation. In an embodiment, the number of external keys 256 corresponds to the number of internal slots 246 of the coupling 202 and the number of internal keys 254 corresponds to the number of external slots 248 of the first mandrel 204. Here, "corresponds" may mean that the numbers are equivalent or that one number is a multiple of the other. For example, in an embodiment in which the first mandrel 204 includes 9 external slots 248, the latch ring 240 may include 1, 3, or 9 internal keys 254. Similarly, in an embodiment in which the coupling 202 includes 8 internal slots 246, the latch ring 240 may include 1, 2, 4, or 8 external keys 256.

Figure 6:
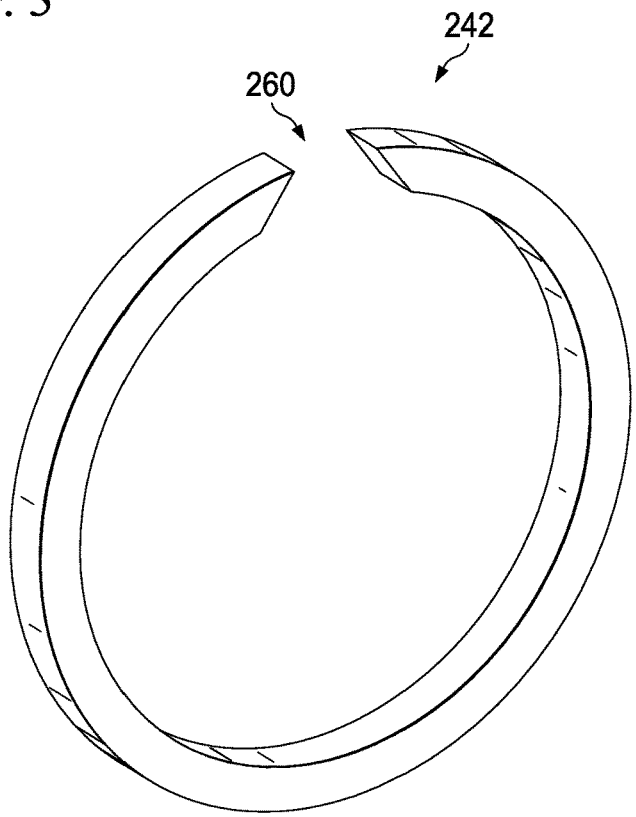
FIG. 6 illustrates a perspective view of a portion of an embodiment of a c-ring used in the coupler assembly of FIG. 2.

An embodiment of a c-ring, or retaining ring 242, is shown in FIG. 6. Like the latch ring 240, the retaining ring 242 also includes a cutaway portion 260 to allow deformation of the retaining ring 242 to allow for easy installation of the retaining ring 242 over the first end 230 if the first mandrel 204 prior to completion of the assembly 100. While a c-ring is shown as a means for restricting axial movement of the latch ring 240 in the locked position, it is noted that any other suitable locking mechanism may also be used. For example, the latch ring may be held in place by a bolt or similar mechanical fastener.

An illustrative method of assembling the foregoing parts of the coupler assembly 100 is described with regard to FIGS. 7-15. The illustrative method involves installing a turnbuckle-type coupling in connection with mandrels having "saw tooth dog clutch" teeth positioned on the mandrels' respective, interlocking ends to transmit torque directly from mandrel to mandrel so as to remove the coupling of the torque path from the axial and tensile coupling of the coupler assembly 100. As such, the coupling 202 is subject only to axial loads in tension and compression when deployed in a tool string. The connection may be designed with a right hand pin thread at the bottom of a mandrel that mates to a right hand thread on the top of the mating coupling. The bottom thread of the coupling may be left handed to mate to a left hand thread on the top end of the next mandrel, thus forming a mandrel-coupling-mandrel connection that joins together tubing segments in a tool string.

Figure 7:
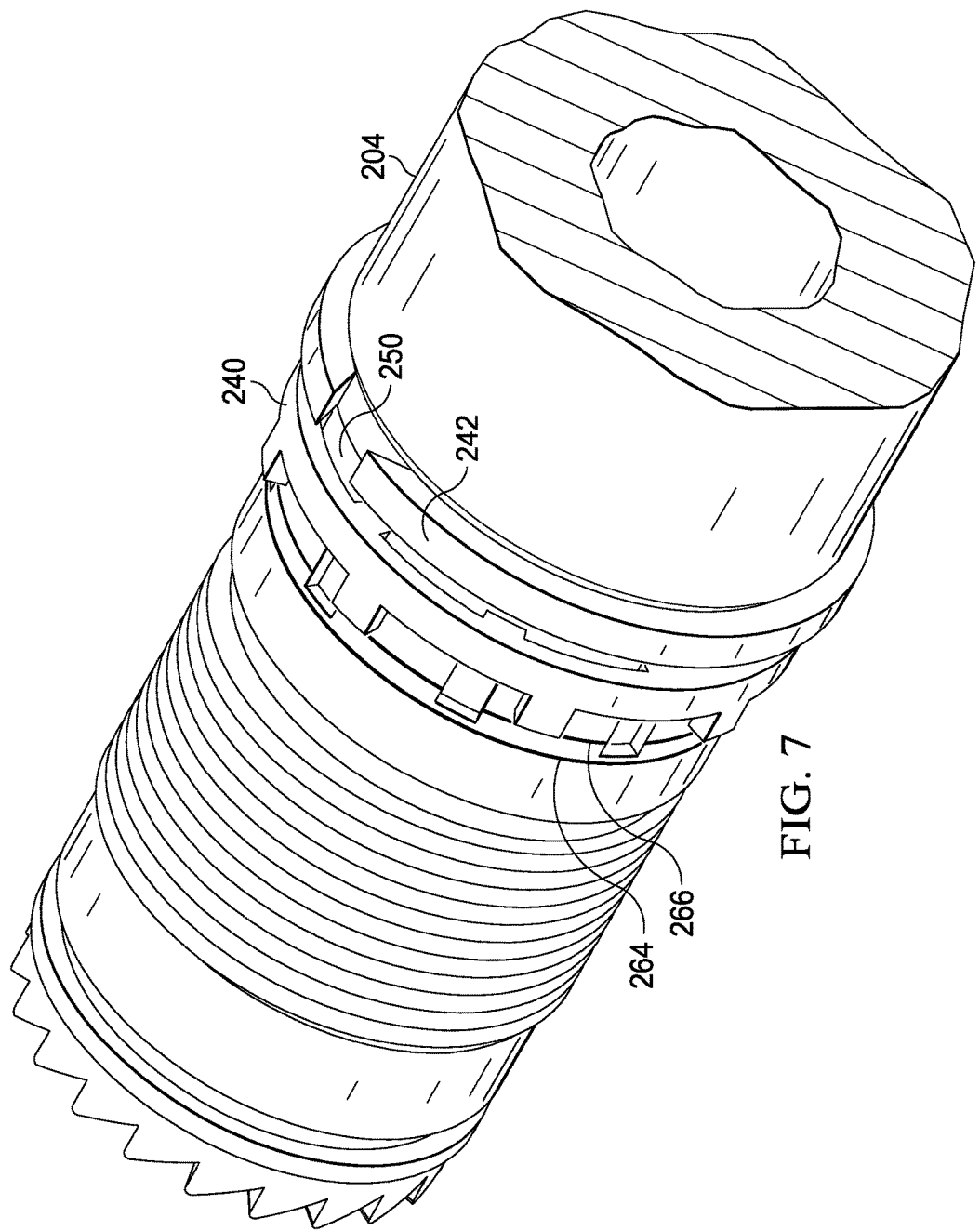
FIG. 7 illustrates a perspective view of a portion of the coupler assembly of FIG. 2 that includes the first mandrel of FIG. 4, the keyed latch ring of FIG. 5, and the c-ring of FIG. 6.

As shown in FIG. 7, the method includes installing the c-ring 242 and latch ring 240 within an upper shoulder of a radial groove 250 of a first mandrel 204. Even after installation of the latch ring 240 and c-ring 242, a first visual indicator 264 and second visual indicator 266 are visible on the mandrel 204. The visual indicators may serve as travel marks that indicate indexing positions for the coupling 202 when completing the coupler assembly.

Figure 8:
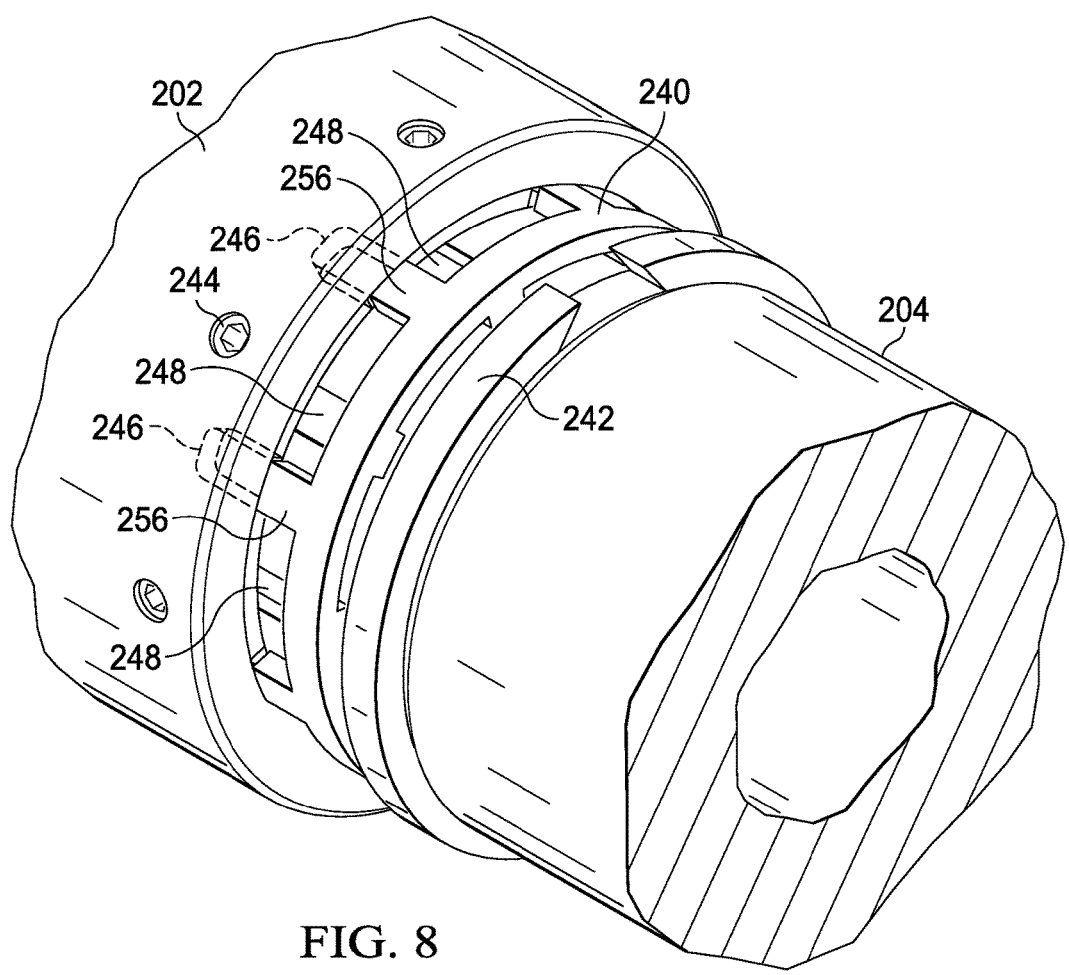
FIG. 8 illustrates a perspective view of a portion of the coupler assembly of FIG. 2 that includes the components of FIG. 7 and a coupler.
Figure 9:
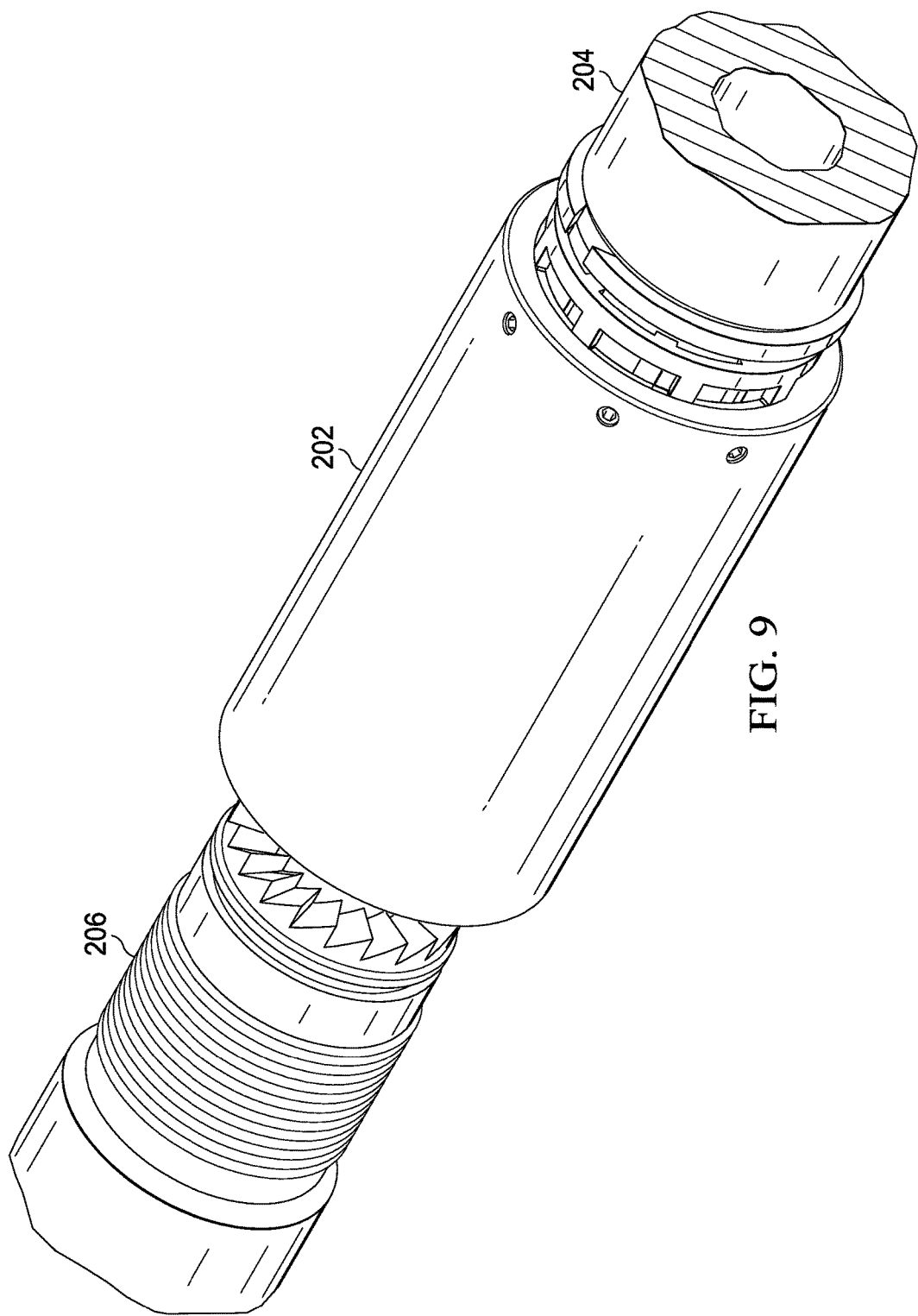
FIG. 9 illustrates a perspective view of a portion of the coupler assembly of FIG. 2 that includes the components of FIG. 8 and a second mandrel.
Figure 10:
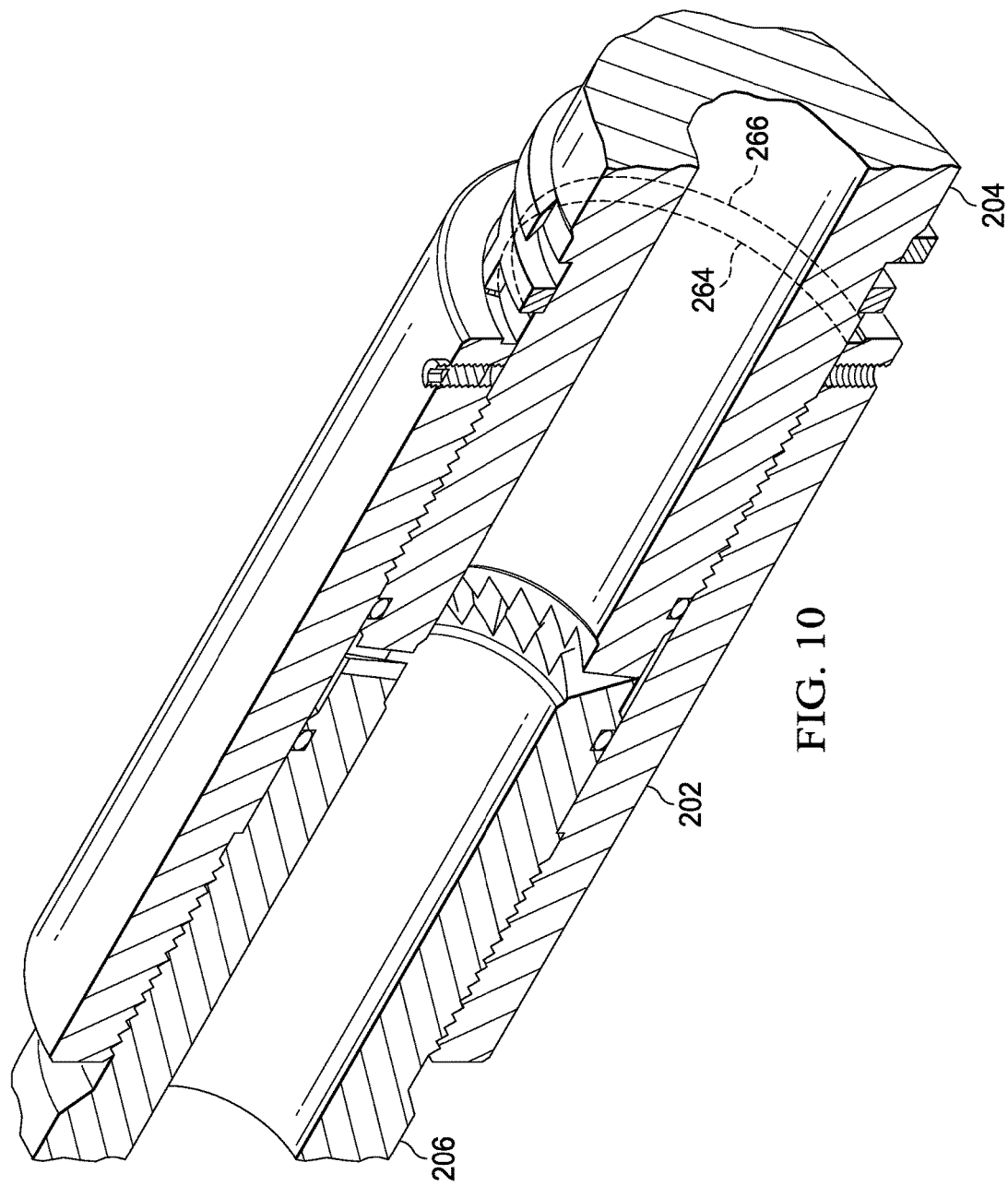
FIG. 10 illustrates a perspective, cross-section view of a portion of the coupler assembly of FIG. 2 that includes the components of FIG. 9, prior to the first mandrel engaging the second mandrel.

As shown in FIG. 8, the method further includes threading the coupling 202 onto the first mandrel 204 until the first end of the coupler is approximately aligned with the first visual indicator 264. In an illustrative embodiment, a temporary set screw 244 is then tightened to fix the position of the coupling 202 relative to the first mandrel 204. As shown in FIGS. 9 and 10, the second mandrel 206 is threaded into the second end of the coupling 202 until a first interlocking interface of the first mandrel 204 contacts a second interlocking interface of the second mandrel 206. In an embodiment, contact between the interlocking interfaces occurs when tips of teeth on each mandrel come into first contact with each other. Once contact is established between the interlocking interfaces, the set screw 244 is loosened to allow initial alignment between the teeth, or interlocking interfaces, of the first mandrel 204 and second mandrel 206.

Figure 11:
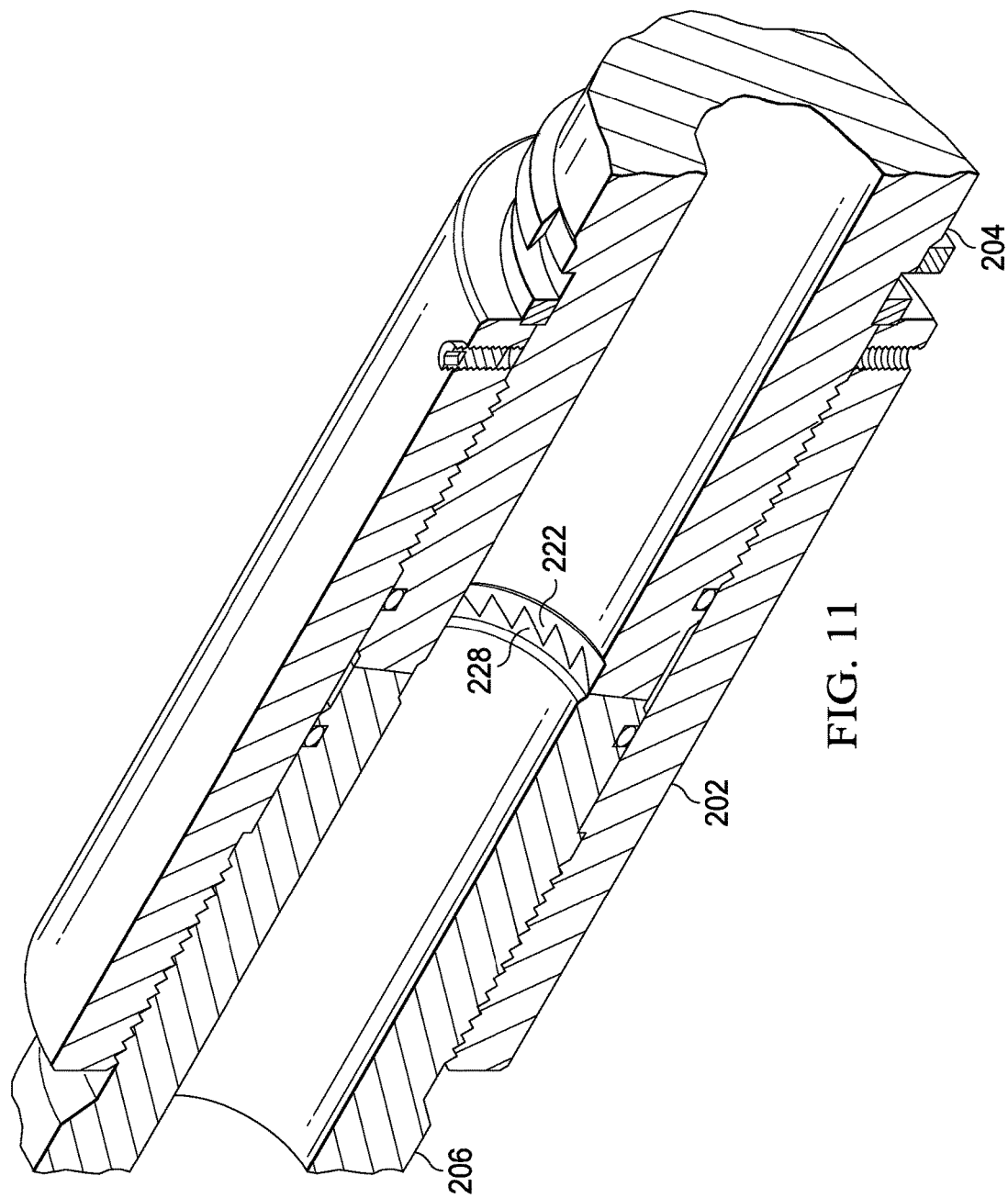
FIG. 11 illustrates a perspective, cross-section view of a portion of the coupler assembly of FIG. 2 that includes the components of FIG. 9, following engagement of the first mandrel and the second mandrel.

With the teeth or other interfaces aligned or intermeshed, the coupling is turned to draw first mandrel 204 and second mandrel 206 toward each other in a turnbuckle fashion until the interlocking interfaces or teeth are completely meshed, as shown in FIG. 11. Alignment with the first end of the coupling 202 and the second visual indicator 266 properly positions the coupling 202 with respect to the axial location of the first interlocking interface 222 and, correspondingly, with respect to the first O-ring groove 220 and second O-ring groove 221 to ensure that O-ring seals between the mandrels and the coupling 202 are correctly positioned in the seal bore 208.

Upon positioning of the coupling 202 and engagement of the first interlocking interface 222 and the second interlocking interface 228, the latch ring 240 is positioned for installation.

Figure 12:
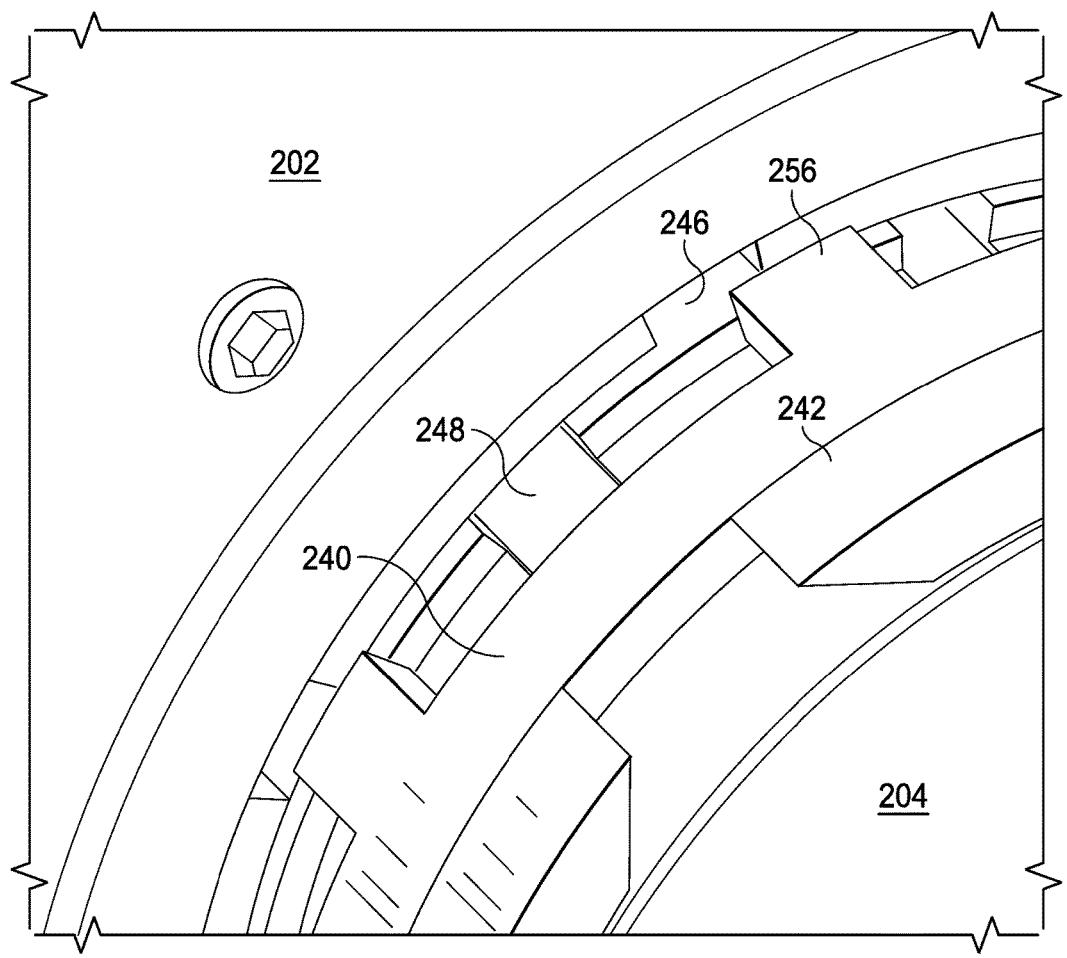
FIG. 12 illustrates a perspective view of a portion of the coupler assembly of FIG. 2 prior to alignment of the keyed latch ring with the coupler and first mandrel.
Figure 13:
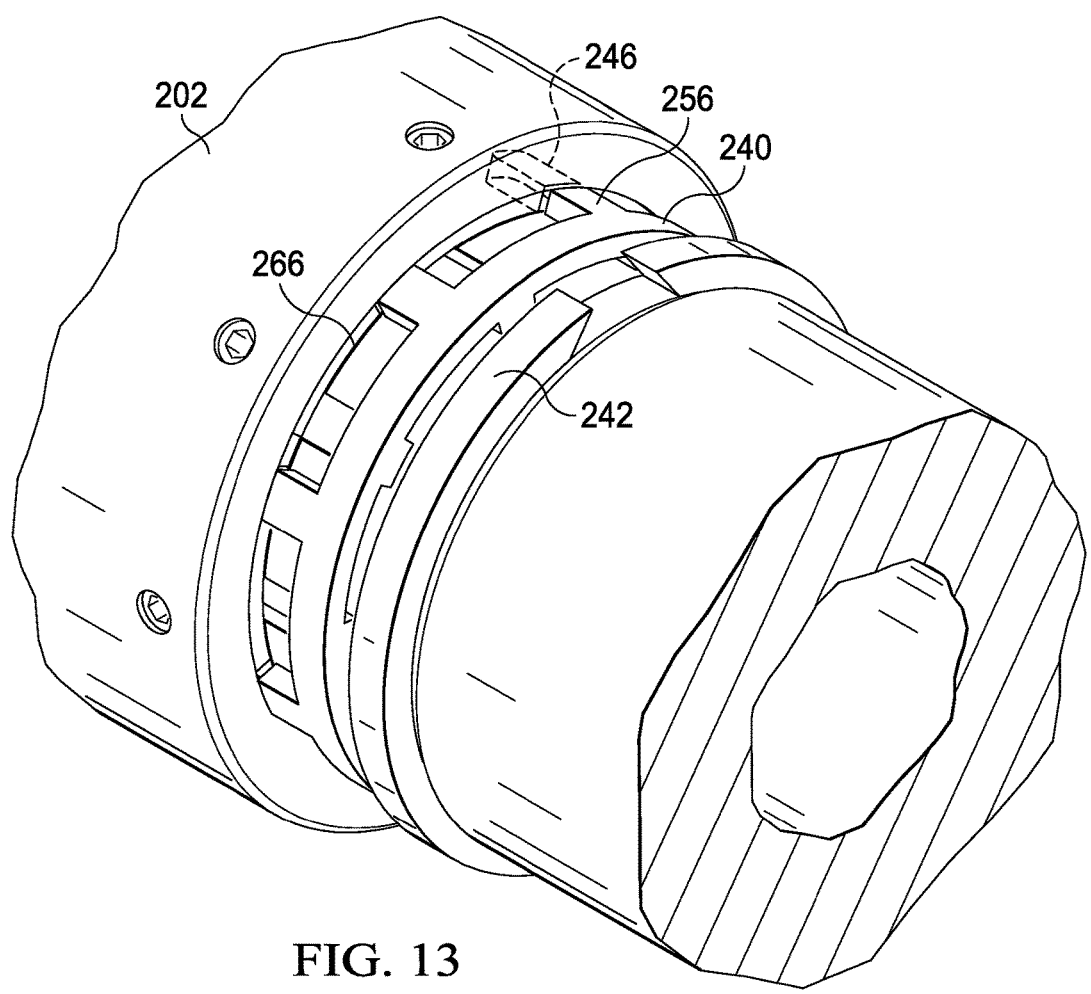
FIG. 13 illustrates a second perspective view of a portion of the coupler assembly of FIG. 2 prior to alignment of the keyed latch ring with the coupler and first mandrel.

As noted above, the latch ring includes a plurality of internal keys 254 that correspond to the number of external slots 248 of the first mandrel 204 and a plurality of external keys 256, which may be castellations that correspond to internal slots 246 in the coupling 202. To continue installation of the coupling 202, the internal keys 254 are axially aligned with the external slots 248 and the external keys 256 are axially aligned with the internal slots 246 as shown in FIGS. 12 and 13. This step may involve slight rotation of the first mandrel 204 relative to the coupling 202.

When aligned, the external slots 248 allow for axial movement of the latch ring 240 either toward the coupling 202 to facilitate locking after mandrel-coupling or away from the coupling 202 for decoupling of the mandrels and disassembly. As such, the external slots 248 and radial groove 250 facilitate three functions. These functions include (1) "out-of-the-way" storage during mandrel coupling, wherein the latch ring 240 may be slid away from the coupling 202, (2) rotation and docking of the latch ring 240 after location of the positioning of the external slots (mandrel slots) 248 and the internal slots (coupler slots) 246 for locking, and (3) when the latch ring 240 is engaged within the assembled mandrel-coupling-mandrel connection, installation of the c-ring 242 within an inner, smaller diameter shoulder of the groove 250 to hold the latch ring 240 firmly in the locked position.

The configuration of the internal keys 254 and external keys 256, and of the external slots 248 and internal slots 246, result in "Vernier" like behavior wherein the coupling 202 may be rotationally indexed by only a small amount to reach a position where the keys of the latch ring 240 engage the external axial slots of the first mandrel 204 and internal axial slots of the coupling 202. In an illustrative embodiment, the coupling 202 has eight slots and the latch ring 240 has eight external keys 256, while the first mandrel 204 has nine external slots 248 and the latch ring has nine internal keys 254. Depending of the limitation of geometry within a given running tool, however, a multitude of possible coupling to mandrel slot ratios could be considered in the interest of providing more or fewer aligning positions.

In the foregoing example, the eight internal slots 246 on the coupling 202 and nine external slots 248 on the first mandrel 204 act as a fine dividing interface providing for nine possible placements of the latch ring 240 relative to the first mandrel 204 and eight possible placements relative to the coupling 202. This equates to seventy-two potential placement combinations or one placement position every five degrees of rotation of a part. Restated, such a configuration allows for a five degree differential between potential aligning positions to attempt to exactly place the latch ring 240 when the coupling 202 is in a tightened position. In an embodiment, this level of granularity is fine enough such that a small amount of torque may provide enough relative movement between the coupling 202 and first mandrel 204 to achieve exact alignment and facilitate installation of the latch ring 240.

As noted above with respect to FIG. 4, the first mandrel includes a groove 250 in which the latch ring 240 and c-ring 242 are initially free to rotate about the first mandrel 204 when in the unengaged position. The latch ring 240 may be rotated within the groove 250 to align the keys of the latch ring 240 with slots in the coupling 202 and first mandrel 204. When rotated and displaced axially to the engaged position, internal keys of the latch ring 240 align with and engage axial external slots in the 248 to prevent rotation of the latch ring 240, and the c-ring snaps into place between the latch ring 240 and a shoulder of the groove 250 to restrict axial movement of the latch ring 240 away from the external slots 248.

Figure 14:
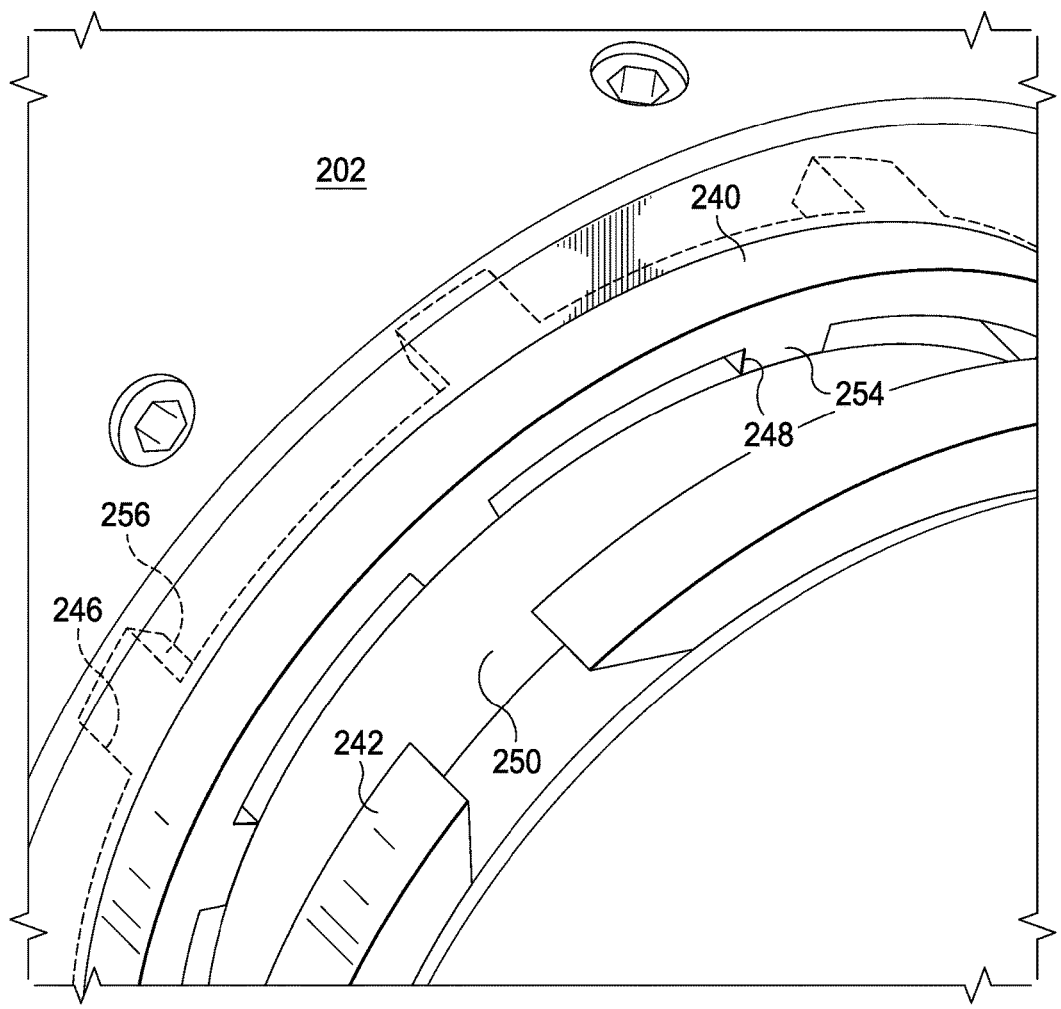
FIG. 14 illustrates a second perspective view of a portion of the coupler assembly of FIG. 2 following alignment of the keyed latch ring with the coupler and first mandrel, and movement of the latch ring into a locked position.

Thus, the method of assembly further includes moving the latch ring 240 axially into a locked or engaged position within the external slots 248 of the first mandrel 204 and internal slots 246 of the coupling 202 (as shown in FIG. 14) after a secure engagement of the first interlocking interface 222 and the second interlocking interface 228. In an embodiment, movement of the latch ring 240 includes moving the latch ring 240 under a shoulder of the coupling 202 that overlies the outer surface of the latch ring 240 to prevent radial deformation of the latch ring 240. In an embodiment, the method also includes moving the c-ring 242 axially within the radial groove 250 to engage a groove surface and prevent axial movement of the latch ring 240 away from the coupling 202 and interlocking interface of the mandrels.

Figure 15:
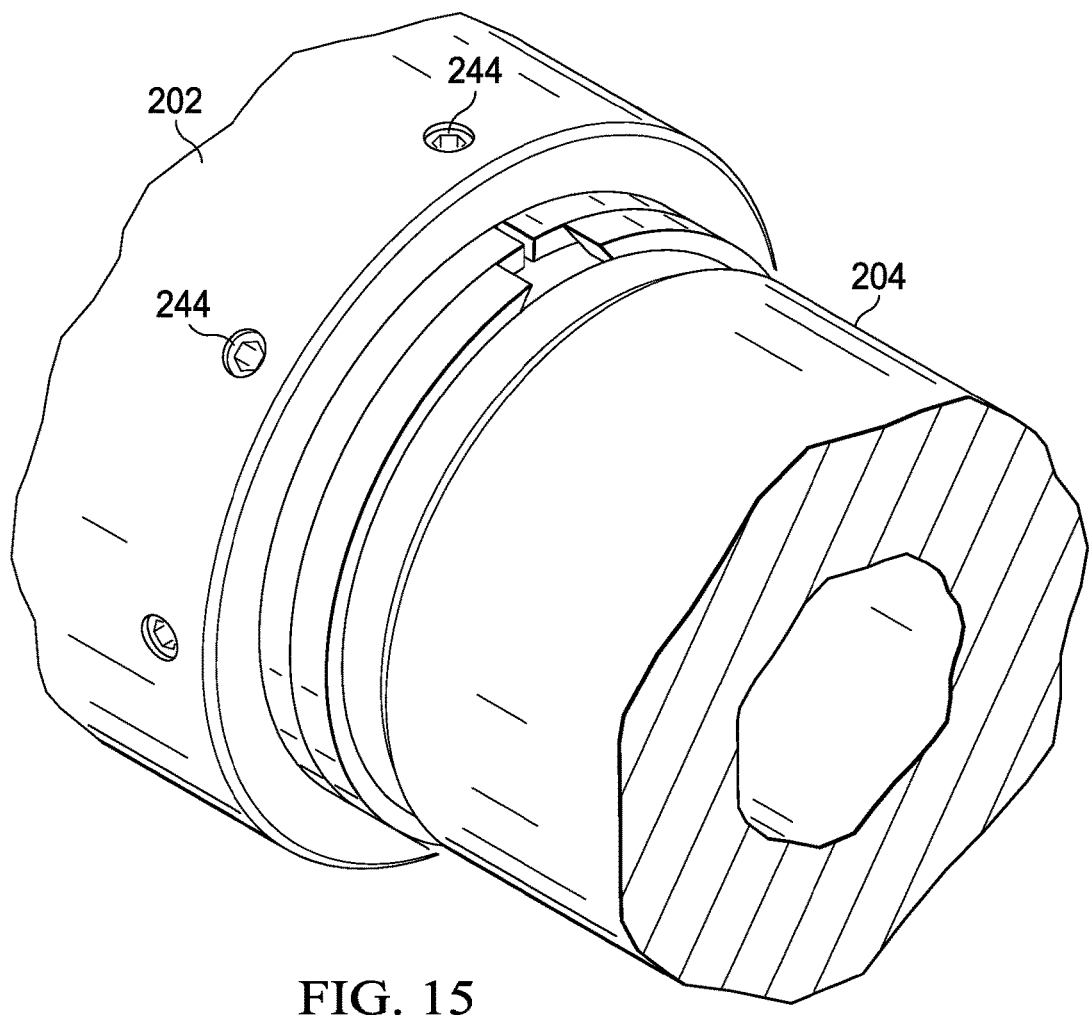
FIG. 15 illustrates a second perspective view of a portion of the coupler assembly of FIG. 2 following completion of assembly.

In an embodiment, the method also includes installing and torqueing a plurality of set screws 244, as shown in FIG. 15, which may be spaced equidistantly and on a common plane about the coupling 202 to assist in securing the assembly in a locked configuration.

Use of the Vernier-like locking of the coupling 202 relative to the first mandrel 204, in tandem with the "saw tooth dog clutch" interlocking interface of the first mandrel 204 and second mandrel 206, results in a secure connection. The secure connection restricts the coupling 202 from experiencing unwanted rotation, which may otherwise be induced by vibration or unconventional thread flank loading due to induced moments through the mandrel and coupler while the tool string is rotated in wells having a small bend radius.

It should be apparent from the foregoing that embodiments of an invention having significant advantages have been provided. While the embodiments are shown in only a few forms, the embodiments are not limited but are susceptible to various changes and modifications without departing from the spirit thereof

We claim:
1. A coupler system for use in a tool string comprising:
a first mandrel having a first interlocking interface at a first end, a first threaded interface about an external surface of the first mandrel, a radial groove comprising a reduced outer-diameter portion of the mandrel and a plurality of external slots extending from the groove toward the first end of the first mandrel;

a second mandrel having a second interlocking interface at a second end;
a coupling comprising a first coupling threaded interface having threads that complement the threaded interface of the first mandrel, and a plurality of internal slots extending from a first end of the coupling; and
a keyed latch ring having a plurality of internal keys and a plurality of external keys, external keys corresponding to the plurality of internal slots of the coupling and the internal keys corresponding to the plurality of external slots of the first mandrel;
wherein the coupling further comprises a shoulder, wherein a portion of the shoulder overlies a portion of the keyed latch ring.

2. The system of claim 1, wherein the second mandrel comprises a second threaded interface about an external surface of the second mandrel, the second threaded interface having a thread direction that opposes the thread direction of the threaded interface of the first mandrel, and wherein the coupling comprises a second coupling threaded interface having threads that complement the second threaded interface.

3. The system of claim 1, wherein the second mandrel comprises a second threaded interface about an external surface of the second mandrel, the second threaded interface having a thread pitch that is less than the thread pitch of the threaded interface of the first mandrel, and wherein the coupling comprises a second coupling threaded interface having threads that complement the second threaded interface.

4. The system of claim 1, further comprising a retaining ring disposed adjacent the keyed latch ring within the groove of the first mandrel.

5. The system of claim 1, further comprising a plurality of set screws, wherein the coupling further comprises a plurality of holes about the about the circumference of the coupling for receiving such plurality of set screws, and wherein the plurality of set screws generate a compressive retaining force about the first mandrel when threaded into the plurality of holes.

6. The system of claim 1, wherein the keyed latch ring comprises n external keys and less than n internal keys.

7. The system of claim 1, wherein the keyed latch ring comprises n external keys and n−1 internal keys.

8. The system of claim 1, wherein the first mandrel comprises a first visual marker at a predetermined distance from the first end.

9. The system of claim 8, wherein the first mandrel comprises a second visual marker at a second predetermined distance from the first end.

10. The system of claim 1, wherein the first interlocking interface and the second interlocking interface comprise interlocking teeth.

11. A method for coupling a first tubing segment to a second tubing segment, the method comprising:
threading a coupling onto a first mandrel and a second mandrel until a first interlocking interface of the first mandrel engages a second interlocking interface of the second mandrel;
aligning an external key of a keyed latch ring with an internal slot of a first end of the coupling;
aligning an internal key of the keyed latch ring with an external slot of the first mandrel; and
axially displacing the keyed latch ring toward the coupling to an engaged position wherein the external key engages the internal slot and the internal key engages the external slot;
wherein the first end of the coupling comprises an internal shoulder having an inner diameter that is substantially identical to an external diameter of the keyed latch ring when the keyed latch ring is in the engaged position, wherein axially displacing the keyed latch ring toward the coupling to an engaged position comprises sliding the keyed latch ring under the shoulder.

12. The method of claim 11, further comprising axially displacing a split ring toward the keyed latch ring into a groove adjacent the keyed latch ring to restrict axial movement of the keyed latch ring away from the coupling.

13. The method of claim 11, wherein threading the coupling onto the first mandrel and the second mandrel comprises aligning a first end of the coupling with a visual indicator on the first mandrel.

14. The method of claim 13 wherein threading the coupling onto the first mandrel and second mandrel comprises aligning the first end of the coupling with a second visual indicator on the first mandrel.

15. The method of claim 11, further comprising engaging a set screw through the coupling to fix the coupling relative to the first mandrel after threading the coupling onto the first mandrel and prior to threading the coupling onto the second mandrel.

16. The method of claim 15, further comprising loosening the set screw after partially threading the coupling onto the second mandrel.

17. The method of claim 11, further comprising engaging a plurality of set screws through the coupling to fix the coupling relative to the first mandrel after axially displacing the keyed latch ring toward the coupling to an engaged position.

18. The method of claim 11, wherein threading the coupling onto the first mandrel and the second mandrel comprises threading a left hand thread of the coupling onto a left hand thread of the first mandrel and threading a right hand thread of the coupling onto a right hand thread of the second mandrel.

* * * * *